(12) United States Patent
Attar et al.

(10) Patent No.: US 9,413,984 B2
(45) Date of Patent: Aug. 9, 2016

(54) LUMINANCE SOURCE SELECTION IN A MULTI-LENS CAMERA

(75) Inventors: Ziv Attar, Zihron Yaakov (IL); Chen Aharon-Attar, Zihron Yaakov (IL)

(73) Assignee: LinX Computational Imaging Ltd., Caesarea, IL (US)

( * ) Notice: Subject to any disclaimer, the term of this patent is extended or adjusted under 35 U.S.C. 154(b) by 134 days.

(21) Appl. No.: 13/881,124

(22) PCT Filed: Oct. 24, 2011

(86) PCT No.: PCT/NL2011/050725
§ 371 (c)(1),
(2), (4) Date: Jul. 8, 2013

(87) PCT Pub. No.: WO2012/057622
PCT Pub. Date: May 3, 2012

(65) Prior Publication Data
US 2013/0293744 A1    Nov. 7, 2013

Related U.S. Application Data

(60) Provisional application No. 61/406,148, filed on Oct. 24, 2010.

(51) Int. Cl.
*H04N 5/232* (2006.01)
*H04N 5/262* (2006.01)
(Continued)

(52) U.S. Cl.
CPC ........... *H04N 5/2621* (2013.01); *H04N 5/2226* (2013.01); *H04N 5/2254* (2013.01);
(Continued)

(58) Field of Classification Search
CPC . H04N 5/2226; H04N 5/23229; H04N 5/262; H04N 5/2621; H04N 5/232; H04N 5/3532; H04N 9/097; H04N 5/2254; H04N 9/045

USPC ......... 348/360, 335, 234, 252, 256, 259, 336, 348/340, 343, 344; 359/619–622, 624, 626, 359/628
See application file for complete search history.

(56) References Cited

U.S. PATENT DOCUMENTS 4,890,905 A    1/1990    Van Rosmalen et al.
5,347,340 A    9/1994    Tsukada
(Continued)

FOREIGN PATENT DOCUMENTS

EP    1206126 A2    5/2002
EP    2336816 A2    6/2011
(Continued)

OTHER PUBLICATIONS

PCT International Search Report, PCT Application No. PCT/NL2011/050722, Apr. 16, 2012, 7 pages.
(Continued)

*Primary Examiner* — Aung S Moe
(74) *Attorney, Agent, or Firm* — Blank Rome LLP

(57) ABSTRACT

The luminance information of an image captured by a multi-lens camera system can be improved by selecting a luminance information source for each portion of the captured image. Each lens of the camera system can capture an initial image. For each portion of a final image, a corresponding initial image portion can be selected as the luminance information source. The portions of the final image and initial images can be pixels, groups of pixels, or other image portions. The luminance information from the selected initial image portions is combined to form final image luminance information. Chrominance information can also be selected from the initial images to form final image chrominance information, and the final image chrominance information and the final image luminance information can be combined to form a final image.

22 Claims, 6 Drawing Sheets

(51) Int. Cl.

| | | |
|---|---|---|
| *H04N 5/222* | (2006.01) | |
| *H04N 9/04* | (2006.01) | |
| *H04N 5/353* | (2011.01) | |
| *H04N 5/235* | (2006.01) | |
| *H04N 5/225* | (2006.01) | |
| *H04N 9/097* | (2006.01) | |
| *H04N 5/265* | (2006.01) | |

(52) U.S. Cl.
CPC ............ *H04N5/2258* (2013.01); *H04N 5/232* (2013.01); *H04N 5/2351* (2013.01); *H04N 5/23229* (2013.01); *H04N 5/262* (2013.01); *H04N 5/265* (2013.01); *H04N 5/3532* (2013.01); *H04N 9/045* (2013.01); *H04N 9/097* (2013.01)

(56) References Cited

U.S. PATENT DOCUMENTS

| | | | |
|---|---|---|---|
| 6,115,065 A | 9/2000 | Yadid-Pecht et al. | |
| 6,765,617 B1 | 7/2004 | Tangen | |
| 6,773,638 B2 | 8/2004 | Kloosterboer et al. | |
| 6,809,766 B1 | 10/2004 | Krymski et al. | |
| 6,898,331 B2* | 5/2005 | Tiana | 382/274 |
| 6,980,248 B1* | 12/2005 | Suda | 348/335 |
| 7,151,259 B2 | 12/2006 | Koch et al. | |
| 7,199,348 B2 | 4/2007 | Olsen | |
| 7,224,384 B1 | 5/2007 | Iddan | |
| 7,233,359 B2* | 6/2007 | Suda | 348/349 |
| 7,564,019 B2 | 7/2009 | Olsen | |
| 7,620,309 B2 | 11/2009 | Georgiev | |
| 7,718,940 B2 | 5/2010 | Hirasawa | |
| 7,916,181 B2 | 3/2011 | Nilehn | |
| 7,932,941 B2 | 4/2011 | Hayasaka | |
| 8,023,016 B2 | 9/2011 | Iijima | |
| 8,049,806 B2 | 11/2011 | Feldman | |
| 8,228,417 B1* | 7/2012 | Georgiev et al. | 348/340 |
| 8,259,212 B2* | 9/2012 | Brady et al. | 348/340 |
| 8,290,358 B1 | 10/2012 | Georgiev | |
| 8,315,476 B1* | 11/2012 | Georgiev et al. | 382/276 |
| 8,345,144 B1* | 1/2013 | Georgiev et al. | 348/340 |
| 8,436,909 B2 | 5/2013 | Farina | |
| 8,514,491 B2* | 8/2013 | Duparre | 359/618 |
| 8,629,390 B2 | 1/2014 | Olsen | |
| 8,749,694 B2* | 6/2014 | Georgiev et al. | 348/345 |
| 8,817,015 B2 | 8/2014 | Georgiev | |
| 8,885,059 B1 | 11/2014 | Venkataraman | |
| 2001/0026322 A1 | 10/2001 | Takahashi | |
| 2002/0067416 A1 | 6/2002 | Yoneda et al. | |
| 2002/0089596 A1 | 7/2002 | Suda | |
| 2002/0122124 A1* | 9/2002 | Suda | 348/263 |
| 2003/0108240 A1 | 6/2003 | Gutta | |
| 2003/0234907 A1 | 12/2003 | Kawai | |
| 2004/0047518 A1 | 3/2004 | Tiana | |
| 2004/0080661 A1 | 4/2004 | Afsenius et al. | |
| 2004/0109004 A1 | 6/2004 | Bastos et al. | |
| 2004/0201748 A1 | 10/2004 | Goldstein | |
| 2005/0052751 A1 | 3/2005 | Liu | |
| 2005/0128323 A1* | 6/2005 | Choi | 348/239 |
| 2005/0128335 A1 | 6/2005 | Kolehmainen | |
| 2005/0128509 A1 | 6/2005 | Tokkonen | |
| 2005/0134699 A1* | 6/2005 | Nagashima et al. | 348/218.1 |
| 2005/0160112 A1 | 7/2005 | Makela | |
| 2005/0225654 A1 | 10/2005 | Feldman et al. | |
| 2005/0259169 A1 | 11/2005 | Ito | |
| 2005/0270395 A1 | 12/2005 | Yoneda et al. | |
| 2006/0003328 A1 | 1/2006 | Grossberg | |
| 2006/0055811 A1 | 3/2006 | Frtiz | |
| 2006/0108505 A1 | 5/2006 | Gruhlke et al. | |
| 2006/0125936 A1 | 6/2006 | Gruhike | |
| 2006/0193509 A1 | 8/2006 | Criminisi et al. | |
| 2007/0075218 A1 | 4/2007 | Gates | |
| 2007/0091197 A1 | 4/2007 | Okayama | |
| 2007/0153086 A1 | 7/2007 | Usui et al. | |
| 2007/0177004 A1 | 8/2007 | Kolehmainen et al. | |
| 2007/0189748 A1 | 8/2007 | Drimbarean et al. | |
| 2007/0211164 A1 | 9/2007 | Olsen et al. | |
| 2007/0252074 A1 | 11/2007 | Ng | |
| 2007/0252908 A1 | 11/2007 | Kolehmainen | |
| 2007/0258006 A1 | 11/2007 | Olsen et al. | |
| 2008/0068452 A1 | 3/2008 | Nakao | |
| 2008/0079839 A1 | 4/2008 | Sung et al. | |
| 2008/0084486 A1 | 4/2008 | Enge | |
| 2008/0218611 A1 | 9/2008 | Parulski et al. | |
| 2008/0219493 A1 | 9/2008 | Tadmor | |
| 2008/0240508 A1 | 10/2008 | Nakao et al. | |
| 2008/0278610 A1 | 11/2008 | Boettinger | |
| 2009/0021612 A1 | 1/2009 | Hamilton | |
| 2009/0103792 A1 | 4/2009 | Rahn et al. | |
| 2009/0140131 A1 | 6/2009 | Utagawa | |
| 2009/0262987 A1 | 10/2009 | Ioffe et al. | |
| 2009/0321861 A1 | 12/2009 | Oliver et al. | |
| 2010/0020078 A1 | 1/2010 | Shpunt | |
| 2010/0021064 A1 | 1/2010 | Lee et al. | |
| 2010/0039713 A1 | 2/2010 | Lusinchi et al. | |
| 2010/0052192 A1 | 3/2010 | Hasegawa et al. | |
| 2010/0085468 A1 | 4/2010 | Park | |
| 2010/0097491 A1* | 4/2010 | Farina et al. | 348/223.1 |
| 2010/0117176 A1 | 5/2010 | Uekawa | |
| 2010/0127157 A1 | 5/2010 | Tamaki et al. | |
| 2010/0128137 A1 | 5/2010 | Guidash | |
| 2010/0171866 A1 | 7/2010 | Brady | |
| 2010/0253833 A1 | 10/2010 | Deever | |
| 2010/0259607 A1 | 10/2010 | Kennedy et al. | |
| 2010/0283837 A1 | 11/2010 | Oohchida | |
| 2011/0019048 A1 | 1/2011 | Raynor | |
| 2011/0069189 A1* | 3/2011 | Venkataraman et al. | 348/218.1 |
| 2011/0080487 A1 | 4/2011 | Venkataraman et al. | |
| 2011/0122308 A1 | 5/2011 | Duparre | |
| 2011/0134282 A1* | 6/2011 | Morita et al. | 348/234 |
| 2011/0157387 A1* | 6/2011 | Han et al. | 348/218.1 |
| 2011/0242356 A1 | 10/2011 | Aleksic | |
| 2012/0007942 A1 | 1/2012 | Michrowski et al. | |
| 2012/0140100 A1 | 6/2012 | Shibazaki | |
| 2013/0002928 A1* | 1/2013 | Imai | 348/333.11 |
| 2013/0121615 A1* | 5/2013 | Intwala et al. | 382/280 |
| 2013/0128087 A1* | 5/2013 | Georgiev et al. | 348/307 |
| 2013/0293744 A1* | 11/2013 | Attar et al. | 348/234 |
| 2013/0308197 A1 | 11/2013 | Duparre | |
| 2013/0321674 A1* | 12/2013 | Cote et al. | 348/242 |
| 2013/0335598 A1 | 12/2013 | Gustavsson | |
| 2015/0234151 A1 | 8/2015 | Venkataraman | |
| 2015/0235371 A1 | 8/2015 | Venkataraman | |
| 2015/0296193 A1 | 10/2015 | Cote | |

FOREIGN PATENT DOCUMENTS

| | | |
|---|---|---|
| JP | 2000 152281 A | 5/2000 |
| JP | 2001078212 A | 3/2001 |
| JP | 2002135795 A | 5/2002 |
| JP | 2002171430 A | 6/2002 |
| JP | 2005 109622 A | 4/2005 |
| JP | 2005 303694 A | 10/2005 |
| JP | 2006246193 A | 9/2006 |
| JP | 2007 158825 A | 6/2007 |
| JP | 2008099329 A | 4/2008 |
| JP | 2010004090 A | 1/2010 |
| JP | 2011 109484 | 6/2011 |
| WO | WO 03/049035 A2 | 6/2003 |
| WO | WO 2004/021264 A1 | 3/2004 |
| WO | WO 2004/027880 A2 | 4/2004 |
| WO | 2006039486 A2 | 4/2006 |
| WO | WO 2007/005714 A2 | 1/2007 |
| WO | WO 2008/085679 A1 | 7/2008 |
| WO | WO 2008/087652 A2 | 7/2008 |
| WO | WO 2009/123278 A1 | 10/2009 |
| WO | WO 2009/151903 A2 | 12/2009 |

(56) References Cited

FOREIGN PATENT DOCUMENTS

| WO | WO 00/22566 A1 | 4/2010 |
| WO | WO 2010/059182 A1 | 5/2010 |
| WO | WO 2010/078563 A1 | 7/2010 |

OTHER PUBLICATIONS

PCT Written Opinion, PCT Application No. PCT/NL2011/050722, Apr. 16, 2012, 14 pages.
PCT International Search Report, PCT Application No. PCT/NL2011/050723, Apr. 20, 2012, 6 pages.
PCT Written Opinion, PCT Application No. PCT/NL2011/050723, Apr. 20, 2012, 12 pages.
PCT International Search Report, PCT Application No. PCT/NL2011/050724, Feb. 6, 2012, 4 pages.
PCT Written Opinion, PCT Application No. PCT/NL2011/050724, Feb. 6, 2012, 5 pages.
PCT International Search Report, PCT Application No. PCT/NL2011/050725, Feb. 1, 2012, 4 pages.
PCT Written Opinion, PCT Application No. PCT/NL2011/050725, Feb. 1, 2012, 10 pages.
PCT International Search Report, PCT Application No. PCT/US2011/050726, Mar. 29, 2012, 6 pages.
PCT Written Opinion, PCT Application No. PCT/US2011/050726, Mar. 29, 2012, 10 pages.
Mirotznik, M. et al., "A Practical Enhanced-Resolution Integrated Optical-Digital Imaging Camera," Proceedings of SPIE, Modeling and Simulation for Military Operations IV, Trevisani, D.A. (ed.), Jan. 2009, pp. 743806-1-743806-9, vol. 7348.
Horstmeyer, R. et al., "Flexible Multimodal Camera Using a Light Field Architecture," 2009 IEEE International Conference on Computational Photography (ICCP2009), IEEE, Apr. 16, 2009, pp. 1-8.
Horisaki, R. et al., "A Compound-Eye Imaging System with Irregular Lens-Array Arrangement," Proceedings of SPIE, Optics and Photonics for Information Processing II, Awwal, A.A.S. et al. (eds.), Aug. 13-14, 2008, pp. 70720G1-70720G-9, vol. 7072.

\* cited by examiner

LUMINANCE SOURCE SELECTION IN A MULTI-LENS CAMERA

CROSS REFERENCE TO RELATED APPLICATIONS

This application is a national phase application of PCT/NL2011/050725, entitled "System and Method for Imaging Using Multi Aperture Camera," filed on Oct. 24, 2011, which in turn claims priority to U.S. Provisional Application No. 61/406,148, filed on Oct. 24, 2010, the contents of which are all hereby incorporated by reference in their entirety.

BACKGROUND

1. Technical Field

This disclosure relates to a camera system, and more specifically, to a multi-lens camera system configured to select between sources of luminance information in generating an image.

2. Description of the Related Art

An imaging system typically consists of an imaging lens and an image sensor. An imaging lens collects light emitted or reflected from objects in a scene and directs collected light upon the image sensor. An image sensor is a photosensitive device that converts light incident upon the image sensor during an image capture to an electronic signal representative of the captured light. To obtain color image data, a color filter array (such as a Bayer filter) is used in conjunction with the image sensor to separate between different spectral regions of the total light spectrum of the image being captured. Color filter arrays separate captured light into (for instance) green image planes, red image planes, and blue image planes.

Given an image sensor's active area dimension (the image sensor's "format") and the desired field of view, the focal length of a lens can be calculated. The size of the aperture of the lens can be set according to image sensor's photo sensitivity, exposure time, and noise level tolerance. The focal length divided by the aperture's size is called the "F-number," and indicates the ability of the lens to collect light. Lower F-Numbers are associated with more light being collected by the lens and directed upon the image sensor.

A phenomena caused by the use of color filter arrays is the appearance of color artifacts also caused by the spatial disposition of the different colors. For example, in a captured image of a white line 1 pixel deep on a black background, the white line will appear in various colors depending on the position of the light from the line incident upon the image sensor. Multi-lens systems can be implemented to reduce such artifacts, but can be accompanied by issues of increased system cost and complexity.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1 illustrates a side view of a single lens camera, according to one example embodiment.

DETAILED DESCRIPTION

Figure 1:
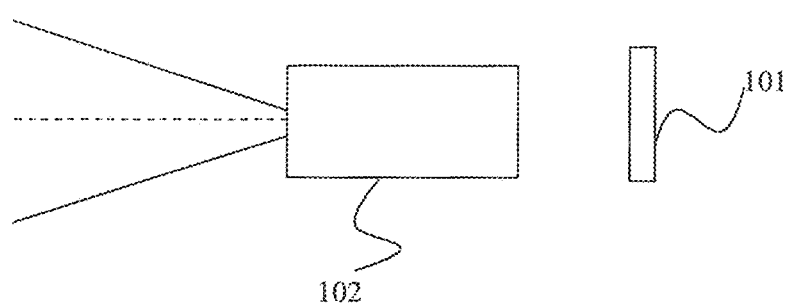

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A multi-lens camera system can improve image luminance by, for each image portion of a field of view, selecting one of the lenses as a source for luminance information for the portion of the field of view. One or more image sensors can be divided into a plurality of image sensor regions, each associated with a different lens. Each lens collects light from the field of view and directs the collected light onto an image sensor region. Each image sensor region captures an initial image representing the light incident upon the image sensor region from an associated lens, and the camera system can combine the initial images to create a final image.

The field of view can be divided into a plurality of portions (such as pixels), and each field of view portion can be associated with an image sensor region portion of each image sensor region. For example, the field of view can be divided into 100 by 100 pixels, and each image sensor region can capture an initial image measuring 100 by 100 pixels, with a 1-to-1 correspondence between each field of view pixel and an associated initial image pixel for each captured initial image. The final image generated by the camera system can include a plurality of portions corresponding to the plurality of field of view portions and the associated plurality of image sensor region portions. The source of luminance information for each final image portion can be selected from among the plurality of associated initial image portions. Continuing with the previous example, if the final image is 100 by 100 pixels, the luminance information for each final image pixel can be selected from among the plurality of associated initial image pixels. By selecting the source of luminance information for each final image portion, the final image can have higher dynamic range and better low light performance than any of the initial images captured by the camera system.

Luminance Source Selection Overview

The multi-lens camera system described herein can improve the effective resolution and spatial resolution of a captured image while improving the low light performance and increasing the dynamic range of the camera system. Each lens in the multi-lens camera system is associated with one or more optical surfaces having a non-zero optical power. For a spatial resolution off, each lens can resolve image details of the size 1/f.

As noted above, each lens of the multi-lens camera system collects light from a field of view and directs the light onto an image sensor region. The image sensor region captures light incident upon the image sensor region from an associated lens to form an initial image. The multi-lens camera system can generate a final image based at least in part on the combination of image information from one or more of the initial images. The final image can be generated by selecting, for each final image portion, luminance information from one of the plurality of associated initial image portions.

The multi-lens camera system can include one or more color filters, polarized filters, chromatic filters, and neutral density filters integrated within the system configured to filter collected light prior to capture by the image sensor. Each initial image can have a different light intensity from other initial images. The camera system can include an algorithm for adding initial images to form a final image having higher dynamic range than the initial images. Each lens in the multi-lens camera system can have a different F-Number than the other lenses, and can be focused to a different distance than the other lenses.

In one embodiment, selecting the source of luminance information for each final image portion includes selecting the sharpest initial image portion associated with the final image portion from among the initial portions. As noted above, the final image portions and initial image portions can be single pixels. Thus, selecting the luminance information for a final image portion can include selecting an associated initial image pixel from among the initial images for a final image pixel. The source of luminance information for any two final image pixels can be different initial images or the same initial image. In addition to selecting the source of luminance information at the pixel level, the source of luminance information can be selected for pixel groups, or for any image portion according to the principles described herein.

Selecting luminance information for the final image at the pixel level can beneficially allow for maximizing the signal to noise ratio for dark image portions and avoiding saturation at bright image portions, particularly at image portions including borders between bright areas and dark area. Selecting luminance information at the pixel group level can beneficially reduce computation time in generating the final image. Computation time can be further reduced by performing edge detection on the initial images, and selecting pixel groups based on the detected edges.

The lenses of the multi-camera system can be focused at the same distance or at different distances, and can have the same field of view or different fields of view. Further, each lens can include various different filters, and the image sensor regions associated with the lenses can be exposed at different times or the same time, or for different intervals of time or the same interval of time. By adjusting the parameters of each lens and the image sensor region exposures, the dynamic range of the final image can be increased, the white balance of the final image can be better controlled, and the low light performance of the camera system can be increased. In one embodiment, luminance information is chosen for dark areas of the final image from an initial image associated with a lens with a broader spectral filter, and for light areas of the final image from other image sensor regions. This can allow for choosing the source of luminance from initial images that are not saturated, further increasing the dynamic range of the final image.

The multi-lens camera system described herein can perform a method for selecting a source of luminance information for each pixel in a final image, including the steps:
1. for each pixel in a final image, comparing the luminance information of a set of corresponding pixels from a plurality of initial images,
2. for each pixel in the final image, selecting a pixel from the set of corresponding pixels as a source of luminance information for the pixel of the final image based on the comparisons,
3. combining the luminance information from the selected pixels to form final image luminance information,
4. selecting chrominance information from each of the initial images to form final image chrominance information, and
5. combining the final image luminance information and the final image chrominance information to form the final image.

System Overview

The system and method described herein provide high quality imaging while considerably reducing the length of the camera as compared to other systems and methods.

Figure 2:
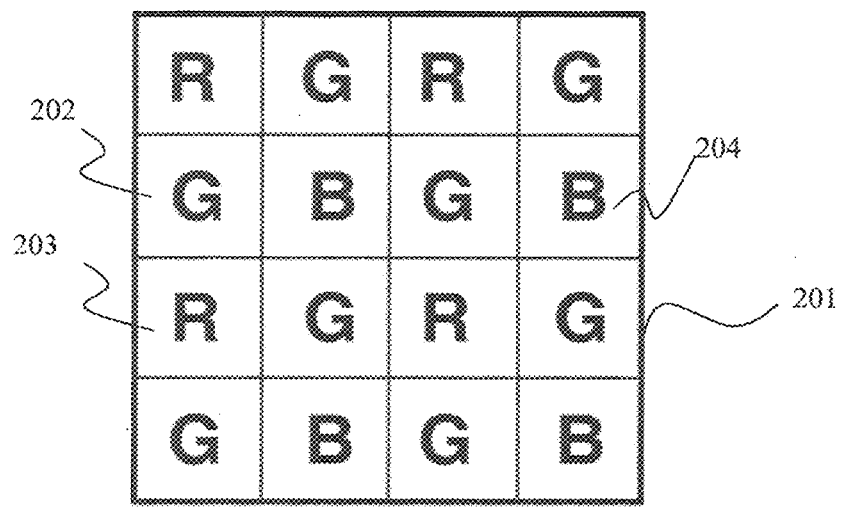
FIG. 2 illustrates a color filter array having multiple pixels, according to one example embodiment.

FIG. 1 illustrates a side view of a single lens camera having a single lens (102) that can include one or more elements and a single sensor (101). FIG. 2 illustrates a sensor array (201) having multiple pixels where the position of the green filter, red filter and blue filter are marked by (202), (203) and (204) respectively. The image that will be taken using this configuration needs to be processed in order to separate the green, red and blue images.

Figure 3:
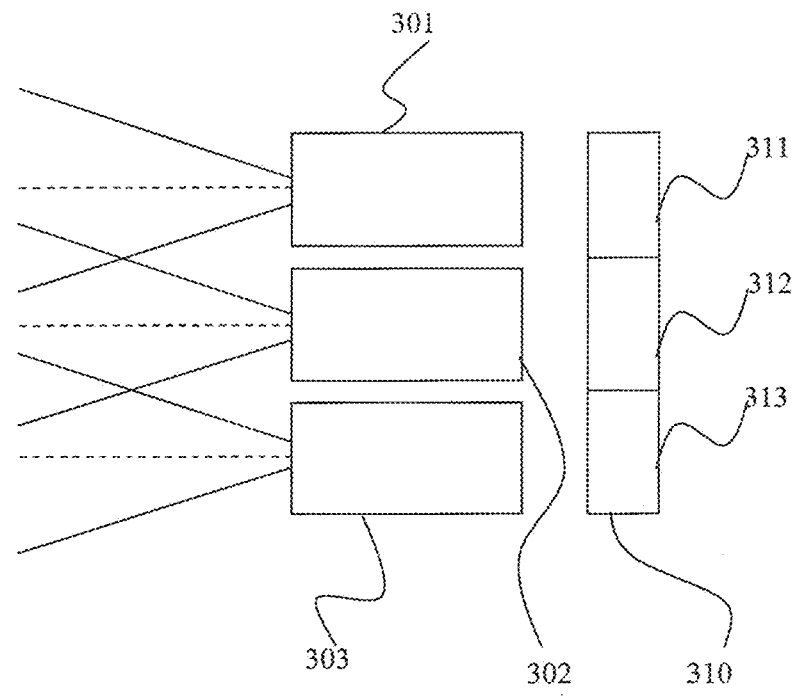
FIG. 3 illustrates a side view of a three lens camera having one image sensor and three lenses, according to one example embodiment.

FIG. 3 illustrates a side view of a three lens camera having one sensor (310) and three lenses (301), (302) and (303). Each one of the said lens will project the image of the same scene on to segments of the sensor marked by (311), (312), and (313) respectively. Each one of the three lenses will have different color filters integrated within the lens, in front of it or between the lens and sensor (310). Using the described configuration the image acquired by the sensor will be composed of two or more smaller images, each imaging information from the scene at different spectrums.

Figure 4:
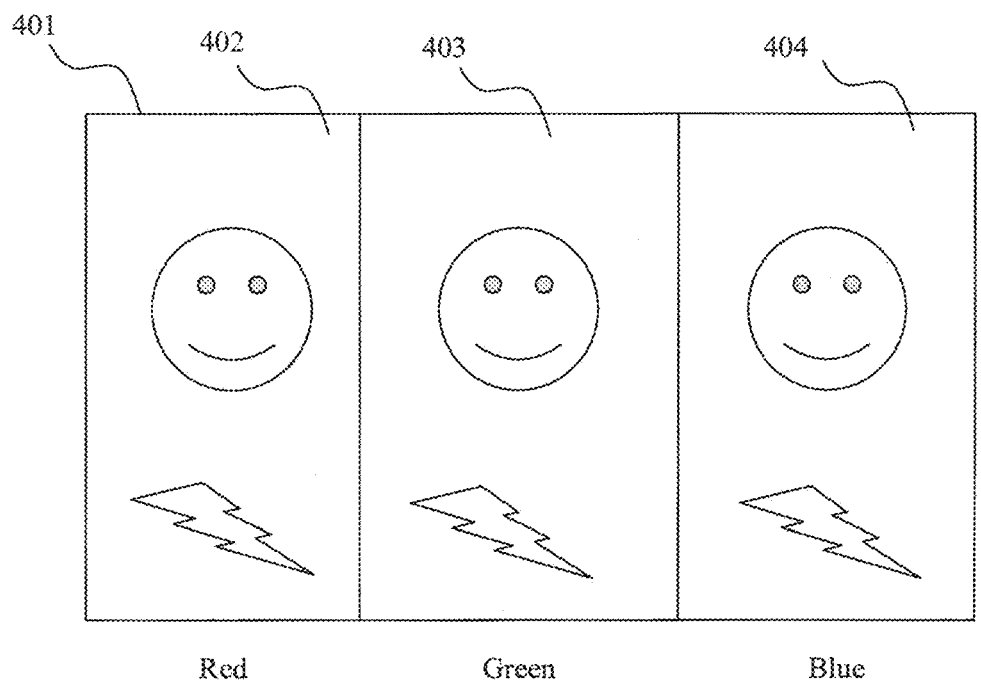
FIG. 4 illustrates an example of a scene as projected on to an image sensor, according to one example embodiment.

FIG. 4 illustrates an example of a scene as projected on to the sensor (401), in each region of the sensor (402), (403) and (404) the same scene is projected but each region will contain information for light at different wavelengths representing different colors according to the filters integrated within the lens that forms the image on each region.

The described configuration does not require the use of a color filter array and therefore the maximal spatial frequency that can be resolved by the sensor can be higher. On the other hand, using smaller lens and smaller active area per channel can result in a smaller focal length of the lens. Therefore, the spatial resolution of objects can be decreased, and the maximal resolvable resolution for each color can remain the same.

The image acquired by the sensor is composed of two or more smaller images, each containing information of the same scene but in different colors. The complete image is then processed and separated in to 3 or more smaller images and combined together to one large color image.

The described method of imaging has many advantages:
1. Shorter lens track (height): Each one of the lenses used can be smaller in size than the single lens covering the same field of view. The total track (height) of each lens can be smaller, allowing the camera to be smaller in height, an important factor for mobile phone cameras, notebook cameras and other applications requiring short optical track.
2. Reduced Color artifacts: Since each color is captured separately, artifacts originating from spatial dependency of each color in a color filter array can be reduced.
3. Lens requirements: Each lens does not have to be optimal for all spectrums used, simplifying the lens design and possibly decreasing the amount of elements used in each lens as no color correction may be needed.
4. Larger Depth of Focus: The depth of focus of a system depends on its focal length. Since smaller lenses are used with smaller focal lengths, the depth of focus is increased by the scale factor, squared.
5. Elimination of focus mechanism: Focus mechanisms can change the distance between the lens and the sensor to compensate for the change in object distance and to assure that the desired distance is in focus during the exposure time. Such a mechanism can be costly and can have many other disadvantages such as increased size, increased power consumption, shutter lag, decreased reliability, and increased price.

Using a fourth lens in addition to the three used for each color red, green and blue (or other colors) with a broad spectral transmission can allow extension of the sensor's dynamic range and can improve the signal-to-noise performance of the camera in low light conditions.

All configurations described above using a fourth lens element can be applied to configurations having two or more lenses.

Another configuration uses two or more lenses with one sensor having a color filter array integrated or on top of the sensor such as a Bayer filter array. In such a configuration no color filter will be integrated in to each lens channel and all lenses will create a color image on the sensor region corresponding to the specific lens. The resulting image will be processed to form one large image combining the two or more color images that are projected on to the sensor.

Dividing the sensor's active area in to 3 areas, one for each of red, green, and blue (for example), can be achieved by placing 3 lenses as illustrated in the figures. The resulting image will include 3 small images containing information of the same scene in a different color.

Figure 5:
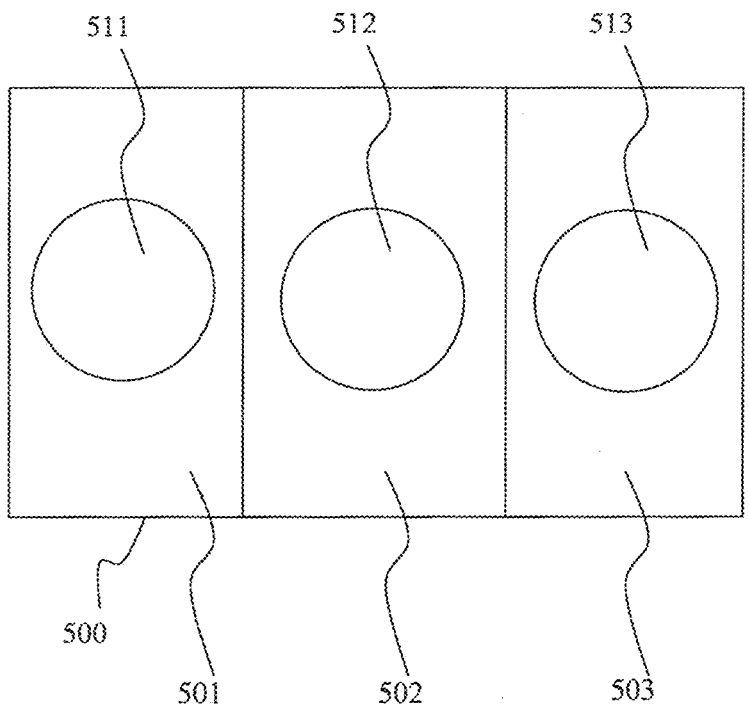
FIG. 5 illustrates a front view of a three lens camera using one rectangular image sensor divided in to three regions, according to one example embodiment.

FIG. 5 illustrates a front view of a three lens camera using one rectangular sensor (500) divided in to three regions (501), (502) and (503). The three lenses (511), (512) and (513) each having different color filters integrated within the lens, in front of the lens or between the lens and the sensor are used to form an image of the same scene but in different colors. In this example each region of the sensor (501), (502) and (503) are rectangular having the longer dimension of the rectangle perpendicular to the long dimension of the complete sensor.

Other three lens configuration can be used, such as using a larger green filtered lens and two smaller lenses for blue and red, such a configuration will results in higher spatial resolution in the green channel since more pixels are being used.

Figure 6:
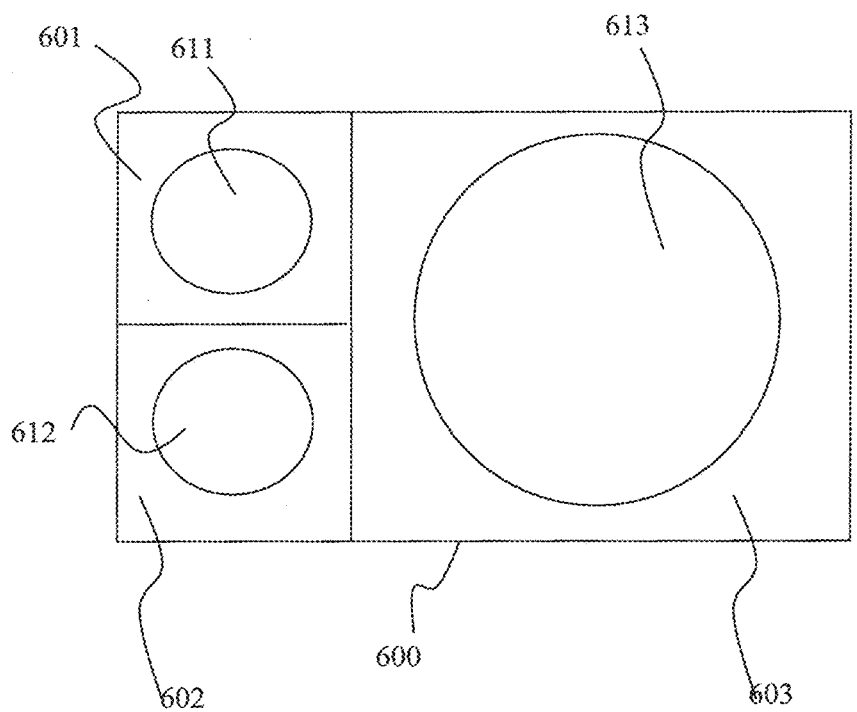
FIG. 6 illustrates a front view of a three lens camera having one image sensor, one large lens and two smaller lenses, according to one example embodiment.

FIG. 6 illustrates a front view of a three lens camera having one sensor (600), one large lens (613) and two smaller lenses (611) and (612). The large lens (613) is used to form an image on the sensor segment marked (603) while the two smaller lenses form an image on the sensor's segments marked with (601) and (602) respectively. The larger lens (613) can use a green color filter while the two smaller lenses (611) and (612) can use a blue and red filter respectively. Other color filters could be used for each lens.

A four lens camera includes 4 lenses each having a different color filter integrated within the lens, in front of the lens, or between the lens and the sensor region corresponding to the lens. The color filter used for two lenses can be the same, resulting in a particular color filter appearing twice among the 4 lenses.

Figure 7:
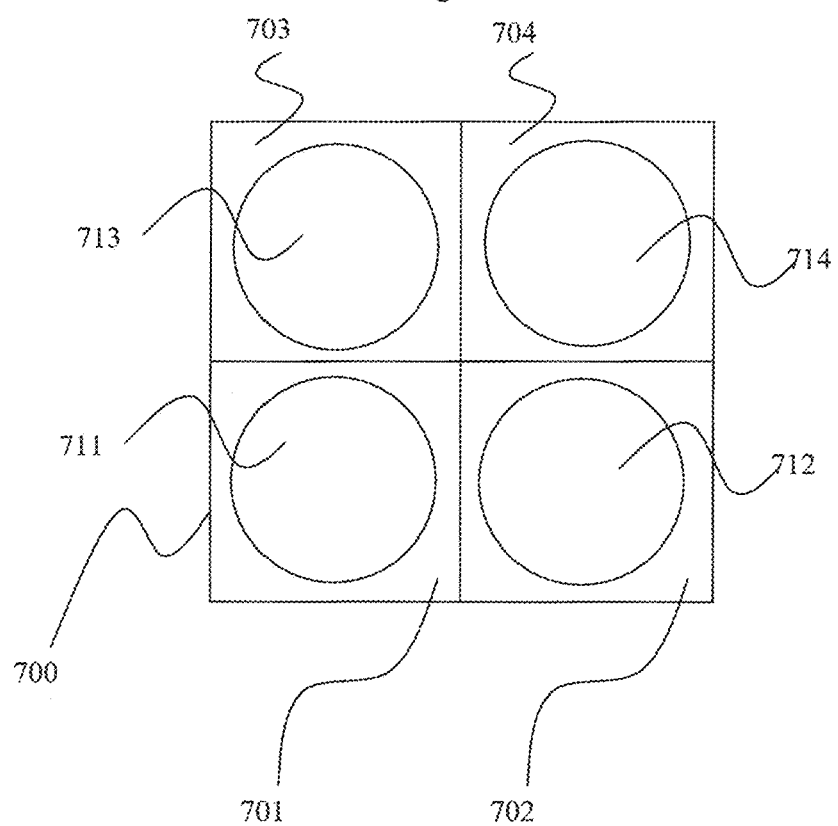
FIG. 7 illustrates a front view of a four lens camera having a one image sensor and four lenses, according to one example embodiment.

FIG. 7 illustrates a front view of a four lens camera having one sensor (700) and four lenses (711), (712),(713) and (714). Each lens forms an image on the corresponding sensor region marked with (701), (702),(703) and (704) respectively. Each one of the lenses will be integrated with a color filter within the lens, in front of the lens, or between the lens and the sensor. All four lenses can be integrated with different color filters, or two of the four lenses can be integrated with the same color filter. For example, two green filters, one blue filter, and one red filter can allow more light collection in the green spectrum.

Figure 8:
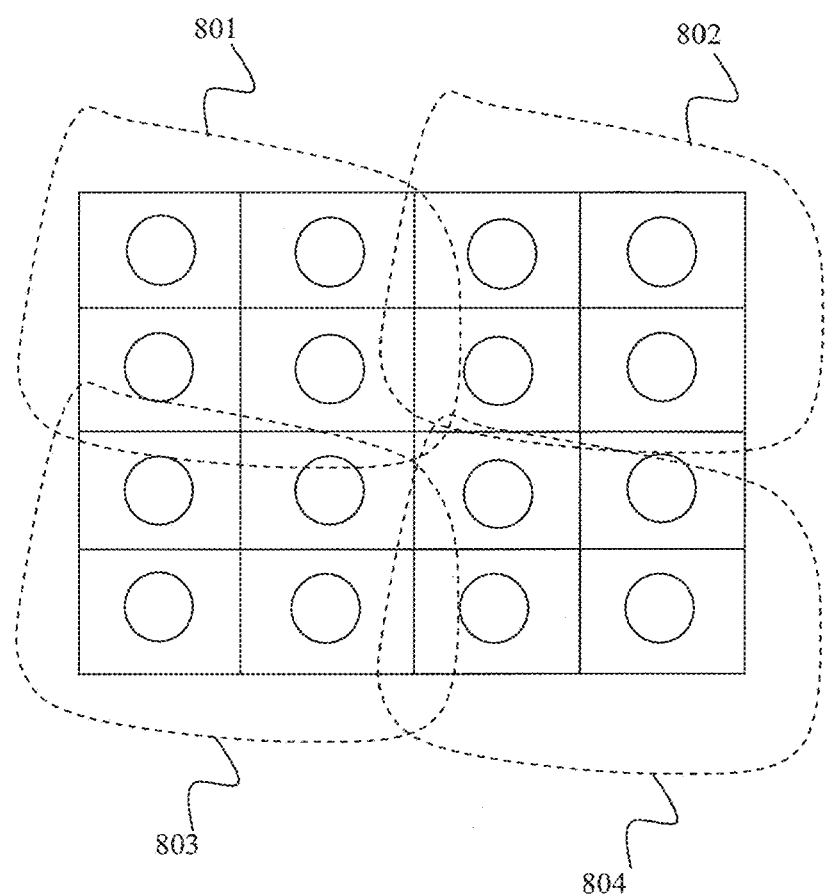
FIG. 8 illustrates a 16 lens camera having four regions, each containing four lenses as illustrated in FIG. 7, according to one example embodiment.

FIG. 8 illustrates a 16 lens camera having 4 regions (801), (802), (803) and (804), each containing four lenses as illustrated in FIG. 7.

Figure 9:
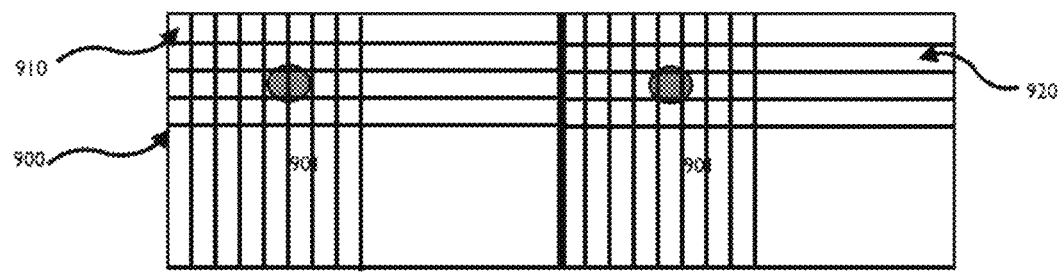
FIG. 9 illustrates a light source incident upon two image sensor regions, according to one example embodiment.

FIG. 9 illustrates a light source 901 incident upon an image sensor 900 including two image sensor regions 910 and 920. The light source 901 is primarily incident upon two pixels of the image sensor region 910, and upon one pixel of the image sensor region 920. Accordingly, the sharpness of the light source in the initial images captured by the image sensor regions 910 and 920 is greater in the pixel of the initial image captured by the image sensor region 920 than in either of the two pixels of the initial image captured by the image sensor region 910. Accordingly, the camera system can select luminance information for a pixel of a final image corresponding to the light source from the initial image captured by the image sensor region 920 over the initial image captured by the image sensor region 910. The camera system can similarly select luminance information for each pixel of the final image, and can combined selected luminance information with chrominance information retrieved from the initial images to form the final image.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A multi-lens camera system, comprising:
   a first lens configured to collect light from a field of view and direct the light onto a first image sensor region, the first image sensor region being configured to capture the light incident upon the first image sensor region and to generate a first initial image having a plurality of first portions;
   a second lens configured to collect light from the field of view and direct the light onto a second image sensor region, the second image sensor region being configured to capture the light incident upon the second image sensor region and to generate a second initial image with a plurality of second portions; and
   a controller configured to generate luminance information for a plurality of final image portions of a final image based on luminance information of the first initial image and the second initial image;
   wherein the controller is configured to, for each final image portion, compare luminance information of each first portion with luminance information of each corresponding second portion, and to select luminance information from either each of the first or the corresponding second portions for each of the final image portions based on the comparison and to select chrominance information by combining each of the first and the second portions for each of the final image portions.

2. The multi-lens camera system of claim 1, wherein each final image portion comprises one pixel of the final image, and wherein the corresponding portions of the first initial image and the second initial image comprise one corresponding pixel in each of the first initial image and the second initial image.

3. The multi-lens camera system of claim 1, wherein each final image portion comprises a set of pixels of the final image, and wherein the corresponding portions of the first initial image and the second initial image comprise a set of corresponding pixels in each of the first initial image and the second initial image.

4. The multi-lens camera system of claim 3, wherein a set of pixels of the final image comprises a set of pixels determined to represent an image edge.

5. The multi-lens camera system of claim 4, wherein the set of pixels is determined to represent the image edge by an edge detection algorithm.

6. The multi-lens camera system of claim 1, wherein the first lens and the second lens are configured to be focused at the same distance.

7. The multi-lens camera system of claim 1, wherein the first lens and the second lens are configured to be focused at different distances.

8. The multi-lens camera system of claim 1, wherein at least one of the first lens and the second lens includes one or more of: a neutral density filter, a chromatic filter, and a polarizing filter.

9. The multi-lens camera system of claim 1, wherein the first image sensor region and the second image sensor region are exposed for different amounts of time.

10. The multi-lens camera system of claim 1, wherein the first lens and the second lens have a substantially similar field of view.

11. The multi-lens camera system of claim 1, wherein each of the final image portions maximizes the signal-to-noise ratio and avoids saturation for each final image portion based on the comparison.

12. A method for capturing an image by a multi-lens camera system, comprising:
   generating, by a first image sensor region, a first initial image having a plurality of first portions, the first initial image representative of light collected by a first lens and incident upon the first image sensor region during a first exposure period;
   generating, by a second image region, a second initial image having a plurality of second portions, the second initial image representative of light collected by a second lens and incident upon the second image sensor region during a second exposure period;
   for each portion of a final image:
   comparing luminance information of each first portion with luminance information of each corresponding second portion; and
   selecting luminance information from either the each of the first portions or the corresponding second portions based on the comparison; and
   combining the selected luminance information for the plurality of corresponding final image portions to form final image luminance information;
   selecting chrominance information for each of the final image portions by combining each of the first and the corresponding second portions for each of the final image portions.

13. The method of claim 12, wherein each portion of the final image comprises one pixel of the final image, and wherein the corresponding portions of the first initial image and the second initial image comprise one corresponding pixel in each of the first initial image and the second initial image.

14. The method of claim 12, wherein each portion of the final image comprises a set of pixels of the final image, and wherein the corresponding portions of the first initial image and the second initial image comprise a set of corresponding pixels in each of the first initial image and the second initial image.

15. The method of claim 14, wherein a set of pixels of the final image comprises a set of pixels determined to represent an image edge.

16. The method of claim 15, wherein the set of pixels is determined to represent the image edge by an edge detection algorithm.

17. The method of claim 12, wherein the first lens and the second lens are configured to be focused at the same distance.

18. The method of claim 12, wherein the first lens and the second lens are configured to be focused at different distances.

19. The method of claim 12, wherein at least one of the first lens and the second lens includes one or more of: a neutral density filter, a chromatic filter, and a polarizing filter.

20. The method of claim 12, wherein the first image sensor region and the second image sensor region are exposed for different amounts of time.

21. The method of claim 12, wherein the first lens and the second lens have a substantially similar field of view.

22. The method of claim 12, further comprising maximizing the signal-to-noise ratio and avoiding saturation for each final image portion based on the comparison.

* * * * *